(12) United States Patent
Takeshima et al.

(10) Patent No.: US 11,587,024 B2
(45) Date of Patent: Feb. 21, 2023

(54) SUPPLY CHAIN MODEL GENERATION SYSTEM

(71) Applicant: HITACHI, LTD., Tokyo (JP)

(72) Inventors: Yoshiteru Takeshima, Tokyo (JP); Hiroki Miyamoto, Tokyo (JP); Yoshiki Kurokawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/122,365

(22) Filed: Sep. 5, 2018

(65) Prior Publication Data

US 2019/0180223 A1    Jun. 13, 2019

(30) Foreign Application Priority Data

Dec. 8, 2017   (JP) ............................. JP2017-235998

(51) Int. Cl.
    *G06Q 10/08*     (2012.01)
    *G06Q 10/087*    (2023.01)

(52) U.S. Cl.
    CPC .................................. *G06Q 10/087* (2013.01)

(58) Field of Classification Search
    CPC .................................................... G06Q 10/087
    See application file for complete search history.

(56) References Cited

U.S. PATENT DOCUMENTS

| | | | | |
|---|---|---|---|---|
| 2011/0125543 A1* | 5/2011 | Saito | .................... | G06Q 10/087 705/7.22 |
| 2013/0283106 A1* | 10/2013 | King | .................... | G06Q 10/087 714/49 |
| 2018/0330315 A1* | 11/2018 | Gurumohan | .......... | G01F 23/296 |

FOREIGN PATENT DOCUMENTS

| | | | |
|---|---|---|---|
| JP | 2002-145421 A | | 5/2002 |
| JP | 2015069236 A | * | 4/2015 |
| WO | 2010/010788 A1 | | 1/2010 |

OTHER PUBLICATIONS

Fu-ren Lin, Effects of Information Sharing on Supply Chain Performance in Electronic Commer, Aug. 2022, IEEE Transaction on Engineering Management, vol. 49, No. 3, pp. 258-268 (Year: 2002).*

* cited by examiner

*Primary Examiner* — Sangeeta Bahl
*Assistant Examiner* — Aaron N Tutor
(74) *Attorney, Agent, or Firm* — Volpe Koenig

(57) ABSTRACT

A supply chain model generation system independently uses a business entity code and an item code representing an item related to a transaction in result information on a supply chain operation of a plurality of business entities; transaction information is extracted from the result information and a transaction time series information table is generated; a relationship in the transaction time series information table in each business entity is analyzed and a virtual business entity code on a supply side and a virtual business entity code on a demand side are assigned for each business entity code; and further a logical model information table where a virtual item code is assigned with respect to an item code related to the transaction of a business entity of the virtual business entity code on the supply side and a business entity of the virtual business entity code on the demand side is generated.

6 Claims, 15 Drawing Sheets

FIG. 3
RESULT MANAGEMENT INFORMATION TABLE 62

| 621 | 622 | 623 | 624 |
|---|---|---|---|
| BUSINESS ENTITY ID | STORAGE LOCATION INFORMATION (OF RESULT INFORMATION) | BUSINESS ENTITY REGISTRATION INFORMATION | VIRTUAL BUSINESS ENTITY CODE I |
| A1 | B1 | C1 COMPANY H1 FACTORY | VE1 |
| A2 | B2 | C2 COMPANY H2 WAREHOUSE | VE2 |
| ... | ... | ... | ... |

FIG. 4
TRANSACTION TIME SERIES INFORMATION TABLE 63

| 631 | 632 | 633 | 634 | 635 | 636 | 637 | |
|---|---|---|---|---|---|---|---|
| VIRTUAL BUSINESS ENTITY CODE II | ACTUAL COUNTERPARTY CODE I | ACTUAL ITEM CODE I | TRANSACTION TYPE | DATE | INTERVAL DAYS | QUANTITY | ... |
| VE1 | F1 | G1 | Outbound | 2017-02-10 | 0 | 20 | ... |
| VE1 | F1 | G1 | Outbound | 2017-02-17 | 7 | 60 | ... |
| VE1 | F1 | G1 | Outbound | 2017-02-23 | 6 | 30 | ... |
| VE2 | F2 | G2 | Inbound | 2017-02-11 | 0 | 20 | ... |
| ... | ... | ... | ... | ... | ... | ... | ... |

INDEX INFORMATION | ATTRIBUTE INFORMATION

FIG. 5
LEARNING INFORATMION I TABLE 64

| 641 | 642 | 643 | 644 | 645 | 646 | 647 | |
|---|---|---|---|---|---|---|---|
| SUPPLY-SIDE VIRTUAL BUSINESS ENTITY CODE II | SUPPLY-SIDE ACTUAL COUNTERPARTY CODE I | SUPPLY-SIDE ACTUAL ITEM CODE I | DEMAND-SIDE VIRTUAL BUSINESS ENTITY CODE II | DEMAND-SIDE ACTUAL COUNTERPARTY CODE I | DEMAND-SIDE ACTUAL ITEM CODE I | DISTANCE | ... |
| VE1 | F1 | G1 | VE2 | F2 | G2 | D1 | ... |
| VE1 | F1 | G1 | VE2 | F2 | G3 | D2 | ... |
| ... | ... | ... | ... | ... | ... | ... | ... |

INDEX INFORMATION OF TRANSACTION TIME SERIES INFORMATION IN OUTBOUND DIRECTION | INDEX INFORMATION OF TRANSACTION TIME SERIES INFORMATION IN INBOUND DIRECTION

FIG. 6
BUSINESS ENTITY CODE CONVERSION INFORMATION TABLE 65

| 651 | 652 | 653 | 654 |
|---|---|---|---|
| ID | VIRTUAL BUSINESS ENTITY CODE III | ACTUAL COUNTERPARTY CODE II | VIRTUAL COUNTERPARTY CODE |
| EID1 | VE1 | F1 | VE3 |
| EID2 | VE2 | F2 | VE4 |
| ... | ... | ... | ... |

CONVERSION SOURCE INFORMATION | CONVERSION DESTINATION INFORMATION

FIG. 7
ITEM CODE CONVERSION INFORMATION TABLE 66

| 661 | 662 | 663 | 664 |
|---|---|---|---|
| ID | VIRTUAL BUSINESS ENTITY CODE IV | ACTUAL ITEM CODE II | VIRTUAL ITEM CODE I |
| IID1 | VE1 | F1 | VG1 |
| IID2 | VE2 | F2 | VG1 |
| ... | ... | ... | ... |

Columns 662–663: CONVERSION SOURCE INFORMATION
Column 664: CONVERSION DESTINATION INFORMATION

FIG. 8
LOGICAL MODEL INFORMATION TABLE 67

| 671 | 672 | 673 | 674 |
|---|---|---|---|
| ID | VIRTUAL ITEM CODE II | SUPPLY-SIDE VIRTUAL BUSINESS ENTITY CODE II | DEMAND-SIDE VIRTUAL BUSINESS ENTITY CODE II |
| LID1 | VG1 | VE1 | VE2 |
| LID2 | VG1 | VE2 | VE1 |
| ... | ... | ... | ... |

FIG. 10A
TIME SERIES INFORMATION a
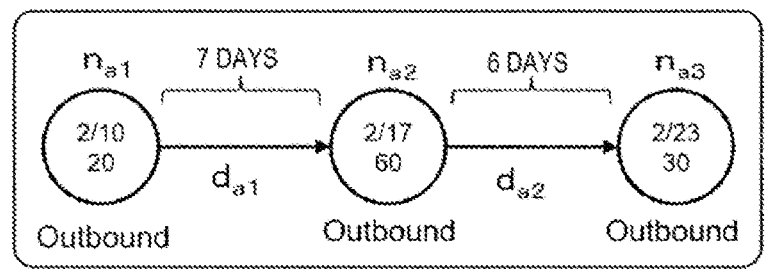
TIME SERIES INFORMATION b
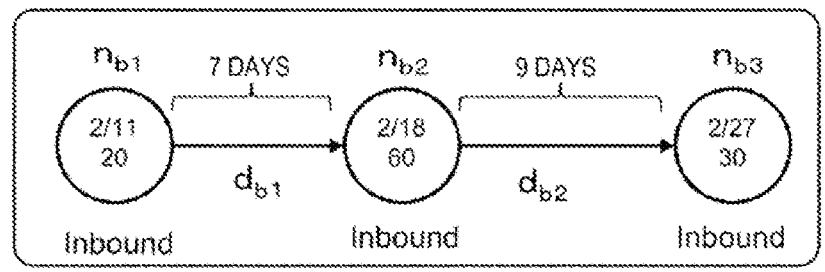

FIG. 10B
TIME SERIES INFORMATION a
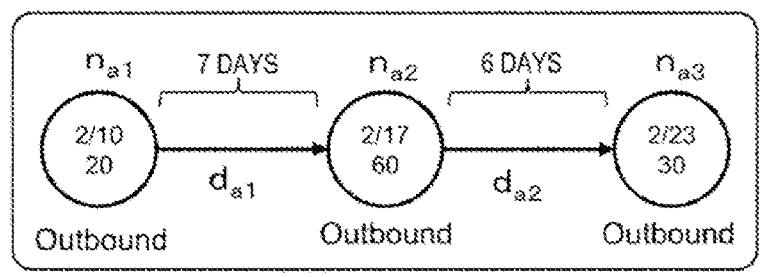
TIME SERIES INFORMATION b
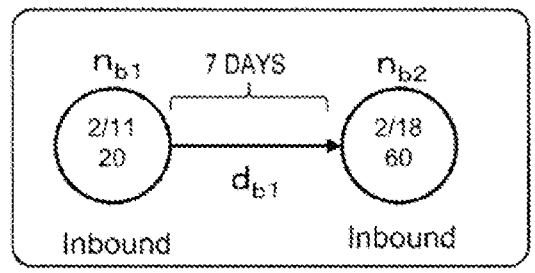
DISTANCE=6

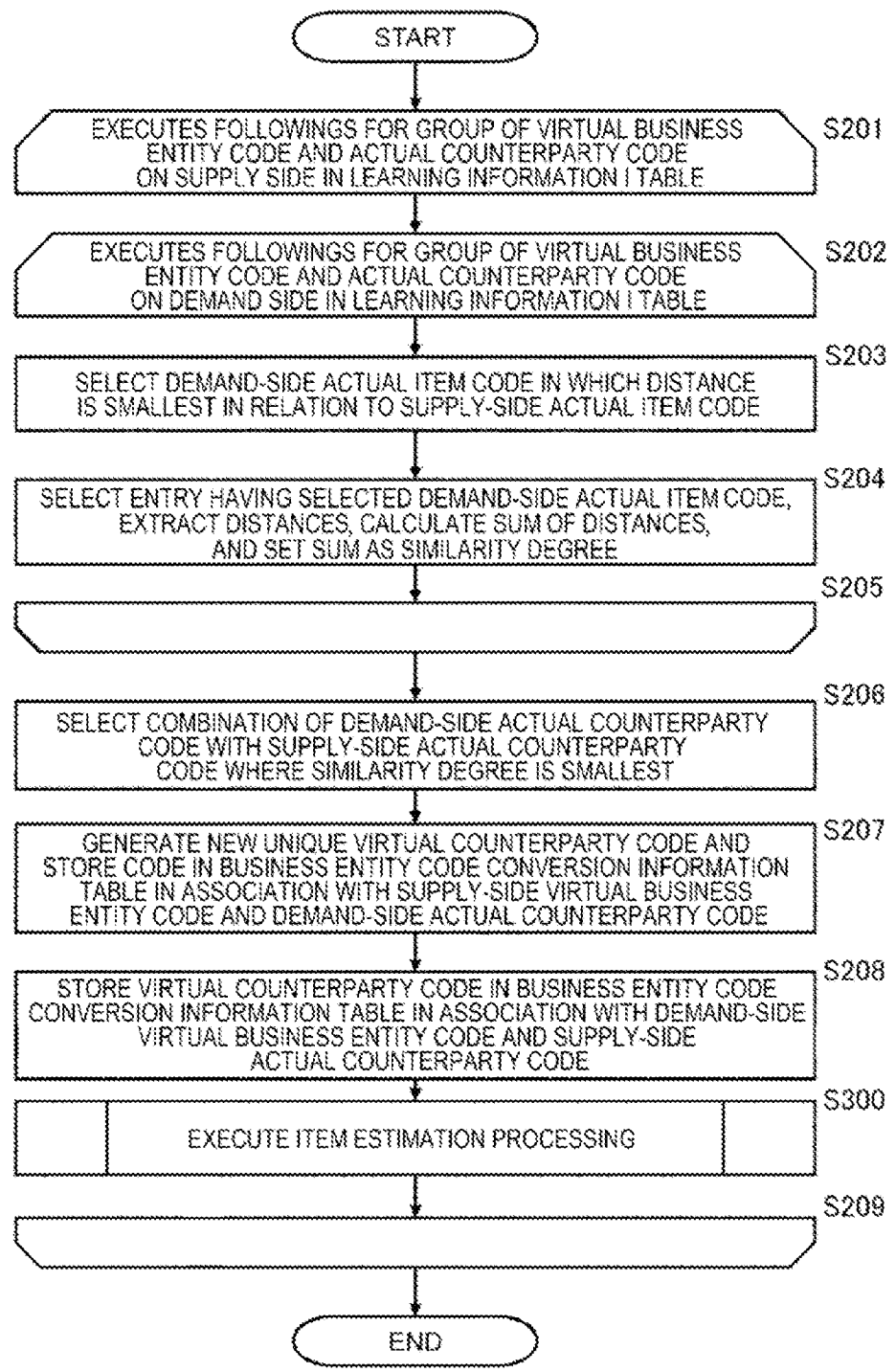

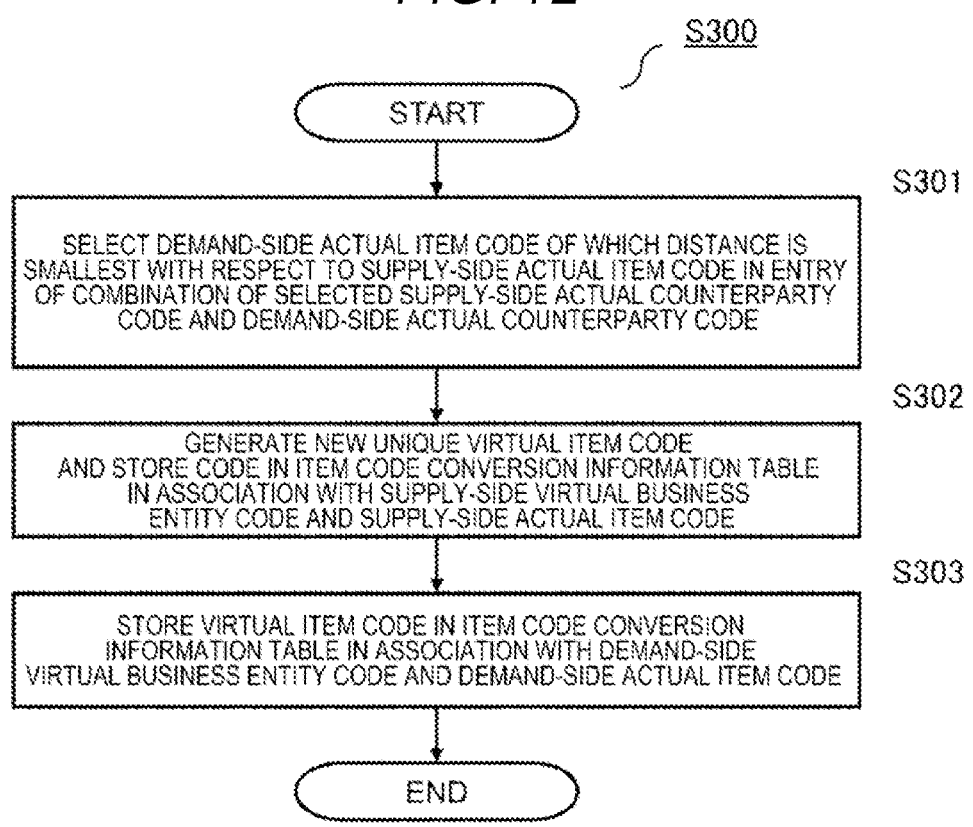

FIG. 16
LEARNING INFORMATION II TABLE 68

| ID | SUPPLY-SIDE VIRTUAL BUSINESS ENTITY CODE III | SUPPLY-SIDE ACTUAL COUNTERPARTY CODE II | SUPPLY-SIDE BUSINESS ENTITY REGISTRATION INFORMATION | DEMAND-SIDE VIRTUAL BUSINESS ENTITY CODE III | DEMAND-SIDE ACTUAL COUNTERPARTY CODE II | DEMAND-SIDE BUSINESS ENTITY REGISTRATION INFORMATION | SIMILARITY DEGREE |
|---|---|---|---|---|---|---|---|
| LID11 | VE1 | F1 | C1 COMPANY H1 FACTORY | VE2 | F2 | C2 COMPANY H2 WAREHOUSE | S1 |
| LID12 | VE1 | F1 | C1 COMPANY H1 FACTORY | VE3 | F3 | C3 COMPANY H3 FACTORY | S2 |
| ... | ... | ... | ... | ... | ... | ... | ... |

681 682 683 684 685 686 687 688

SUPPLY CHAIN MODEL GENERATION SYSTEM

INCORPORATION BY REFERENCE

This application claims priority based on Japanese patent application, No. 2017-235998 filed on Dec. 8, 2017, the entire contents of which are incorporated herein by reference.

BACKGROUND

The present invention relates to a supply chain model generation system, and more particularly to a supply chain model generation system suitable to generate model information in which information on the entirety of a supply chain is simplified and converted into data and to perform a simulation.

In a logistics industry, activities from procurement of raw materials to selling products to customers through order receiving, production, and logistics are called supply chains. In the supply chain, when there is a weak point in catching the flow of goods, information, or the like in the chain, for example, when a situation where inventory quantity is unclear occurs, there is a concern that the supply chain is disconnected, so that smooth operation of the business cannot be done. Therefore, in order to optimize the flow of goods and information of business activities such as procurement of materials, production, and sale from procurement of the materials to delivery to customers, it is necessary for every task in the supply chain to capture the flow of goods in real time. Therefore, the introduction of an information system/package called an Enterprise Resource Planning (ERP) package has been advanced for enterprise core business. The ERP package is an integrated business package and is package software of a company information system which integrates the business over the entirety of company activities such as sales, production, logistics, finance, and the like, throughout the company (WO 2010/010788, paragraph number 0008).

In addition, to optimize the supply chain, development of a method of modeling a supply chain model, simulating with a simulator to optimize the supply chain has been carried out.

In WO 2010/010788, a technique in which product information, production information, logistics route information, and sales opportunity loss cost information are incorporated from the ERP package and, when a sales plan changes, the number of inventory of products and materials which do not cause product shortage and in which the total cost of inventory amounts of products and materials and logistics costs of products and materials is minimized is calculated is disclosed.

In addition, JP-A-2002-145421 discloses a technique for simulating the flow of goods and money on the supply chain and quantitatively evaluating the effect of the supply chain with a plurality of indicators such as inventory, profit, cash flow, and the like.

Most of companies do not integrate the content of a company information system on a supply chain. Not only among companies but also companies which have bases in the globe and companies which have acquired other companies, a company information system is dispersed and various masters such as (Bill of materials) BOM may exist for each base or business. In this case, BOM is a form of a parts list and mainly used in a manufacturing industry and, in a company information system, it is data representing a list of parts and a hierarchical structure at the time of assembling products.

In such a case, the description of various masters may not be unified. For example, the same item code is not necessarily allocated to the same parts among respective company information systems. In a case of a company code, the situations are the same.

Furthermore, various codes may be erroneously input to the system in some cases. It is conceivable that situations such as mistyping, missing of specific words and symbols, abbreviations, different (exchanged) word order, attachment of "( . . . )" occur. In such a case, trying to change a certain master can cause various problems.

For example, when business is done between systems, situations where, for example, even though they are the same parts, the system treats them as different parts and it takes time to transport information and reflect changes to other systems, and further, the change is not reflected occur.

Here, when a supply chain constituted of a plurality of companies and bases is evaluated, it is necessary to acquire information from various masters of each company information system and to establish association between the acquired various pieces of information.

However, due to the causes described above, there may be a problem that association between various pieces of information cannot be established in code information such as item codes and company codes.

WO 2010/010788 and JP-A-2002-145421 of the related art described above disclose a technique for generating a simulation model for quantitatively evaluating a supply chain.

However, in WO 2010/010788 and JP-A-2002-145421, as described above, no consideration is given to generating a supply chain model for simulation by absorbing a difference in descriptions of various masters. That is, in WO 2010/010788 and JP-A-2002-145421, no technique is disclosed for generating and managing model information describing the information of the entirety of a supply chain as a whole in order to evaluate the supply chain constituted of a plurality of business entities such as companies and bases by simulation.

SUMMARY

An object of the invention is to provide a supply chain model generation system which generates a supply chain model for the simulation by absorbing the difference in data description of a company information system on a supply chain and integrating the pieces of information on the entirety of a supply chain in order to evaluate the supply chain constituted of a plurality of business entities such as companies and bases by simulation.

According to a configuration of a supply chain model generation system of the invention, there is provided a supply chain model generation system which generates a logical model related to a transaction of a supply chain constituted of a plurality of business entities, in which a business entity code representing each business entity and an item code representing an item related to the transaction are independently used in result information on a supply chain business of the plurality of business entities, and transaction information is extracted from the result information and a transaction time series information table is generated, and further, a relationship in the transaction time series information table in each business entity is analyzed and a supply-side virtual business entity code and a demand-side virtual business entity code are assigned for each business entity code of each business entity, and further a logical model information table where a virtual item code is assigned with respect to an item code related to the transaction of the business entity of a virtual business entity code on the supply side and a business entity of a virtual business entity code on a demand side is generated.

According to the invention, it is possible to provide a supply chain model generation system which generates a supply chain model for the simulation by absorbing the difference in data description of a company information system on a supply chain and integrating the pieces of information on the entirety of a supply chain in order to evaluate the supply chain constituted of a plurality of business entities such as companies and bases by simulation.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a diagram for explaining an example of a result management information table;

FIG. 4 is a diagram for explaining an example of a transaction time series information table;

FIG. 5 is a diagram for explaining an example of a learning information I table;

FIG. 6 is a diagram for explaining an example of a business entity code conversion information table;

FIG. 7 is a diagram for explaining an example of an item code conversion information table;

FIG. 8 is a diagram for illustrating an example of a logical model information table;

FIG. 10A is a diagram for explaining distance calculation processing (part 1);

FIG. 10B is a diagram for explaining the distance calculation processing (part 2);

FIG. 11 is a flowchart illustrating counterparty/item estimation processing;

FIG. 12 is a flowchart illustrating details of item estimation processing;

FIG. 16 is a diagram for explaining an example of a learning information II table.

DETAILED DESCRIPTION OF THE EMBODIMENTS

Figure 1:
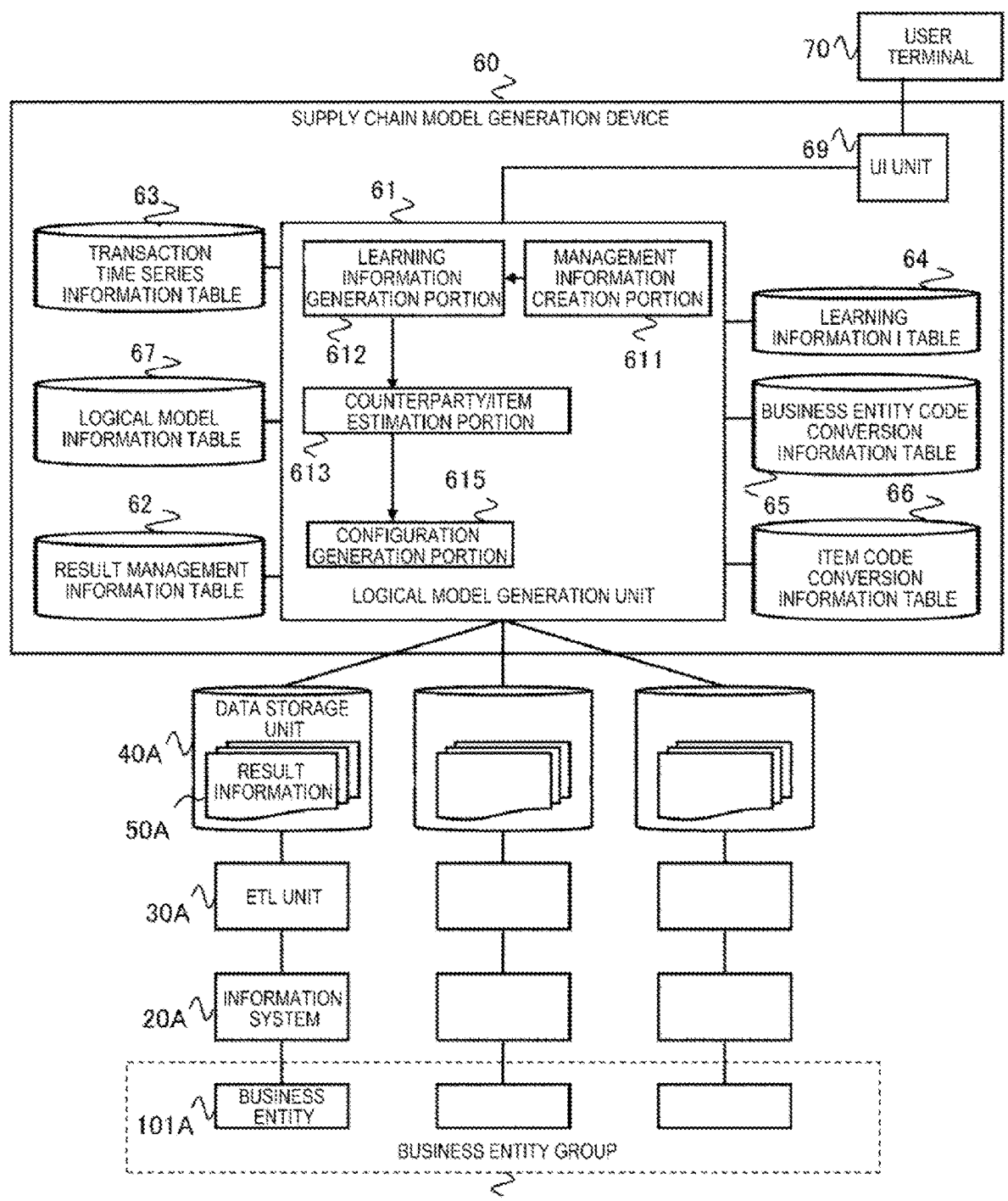
FIG. 1 is a block diagram illustrating a configuration of a supply chain model generation system according to Embodiment 1.

Hereinafter, Embodiments of the invention will be described with reference to FIGS. 1 to 17.

Embodiment 1

Hereinafter, Embodiment 1 will be described with reference to FIGS. 1 to 13.

First, the configuration of a supply chain model generation system according to Embodiment 1 will be described with reference to FIGS. 1 and 2.

The supply chain model generation system of the embodiment includes a supply chain model generation device 60, a user terminal 70 connected thereto, an information system 20A, an ETL unit 30A, and a data storage unit 40A.

The user terminal 70 is a device which inputs data to the supply chain model generation device 60 and displays the data output from the supply chain model generation device 60.

The information system 20A, the ETL unit 30A, and the data storage unit 40A are parts which handle data related to a business entity 101A belonging to a business entity group 10.

The information system 20A is a system which handles information with a computer for supporting the business of the business entity 101A included in the business entity group 10 as a subject. The Extract, Transform, Load (ETL) unit 30A is a support unit for constructing a database and is a functional unit which extracts data from a database such as a backbone system, converts the data into an appropriate form, and reads in a database. The data storage unit 40A is a functional unit which manages the database of the information system 20A of the business entity 101A read by the ETL unit 30A.

The supply chain model generation device 60 is a device which gathers and inputs data related to the business of a plurality of business entity groups 10 and generates a supply chain model.

The supply chain model generation device 60 is constituted of a logical model generation unit 61 and a UI unit 69. Further, the supply chain model generation device 60 stores a result management information table 62, a transaction time series information table 63, a learning information table 64, a business entity code conversion information I table 65, an item code conversion information table 66, and a logical model information table 67.

The logical model generation unit 61 includes functional portions of a management information creation portion 611, a learning information generation portion 612, a counterparty/item estimation portion 613, and a configuration generation portion 615.

The management information creation portion 611 is a functional portion which creates a result management information table 62 from result information 50A accumulated by the data storage unit 40A and manages the table.

The learning information generation portion 612 is a functional portion which creates the transaction time series information table 63, calculates a distance from mutual time series information of transactions, and generates the learning information I table 64.

The counterparty/item estimation portion 613 is a functional portion which generates a virtual counterparty code based on the learning information I table 64 and registers it in the business entity code conversion information table 65, and further creates a virtual item code and registers it in the item code conversion information table 66.

The configuration generation portion 615 is a functional portion which generates, based on the transaction time series information table 63, the business entity code conversion information table 65, and the item code conversion information table 66, the logical model information table 67 in which the virtual item code is associated with each of a virtual business entity code on a supply side and a virtual business entity code on a demand side.

The details of each table will be described below.

Next, the hardware/software configuration diagram of the supply chain model generation device will be described with reference to FIG. 2.

The supply chain model generation device 60 is realized by an information processing device such as a general Personal Computer (PC) and constituted of a CPU 1001, a main storage device 1002, an auxiliary storage device 1003 such as a Hard Disk Drive (HDD), a network interface 1004 such as a Network Interface Card (NIC) for connecting to a communication network 3000, an input device 1005 such as a keyboard and a mouse, and an output device 1006 such as a display, and further a communication bus 1009 is connected between these devices.

The communication network 3000 is a communication network in the form of a Local Area Network (LAN) or the like and is a pathway for performing a data communication with an external system 4000. Generally, it is a wired LAN, but a wireless LAN may be used. Further, it may be connected to the external system 4000 via a Wide Area Network (WAN).

A program for realizing the function of the supply chain model generation device 60 of the embodiment is stored in the auxiliary storage device 1003 and the function of each program can be realized by loading it to the main storage device 1002 and executing it by the CPU 1001.

In the auxiliary storage device 1003 of the supply chain model generation device 60 of the embodiment, a logical model generation program 2000 and a UI program 2100 are installed. The logical model generation program 2000 is a program for realizing the function of the logical model generation unit 61 illustrated in FIG. 1. The UI program 2100 is a program for realizing the function of the UI unit 69 illustrated in FIG. 1.

The logical model generation program 2000 is constituted of a management information creation module 2011, a learning information generation module 2012, a counterparty/item estimation module 2013, and a configuration generation module 2015.

Figure 2:
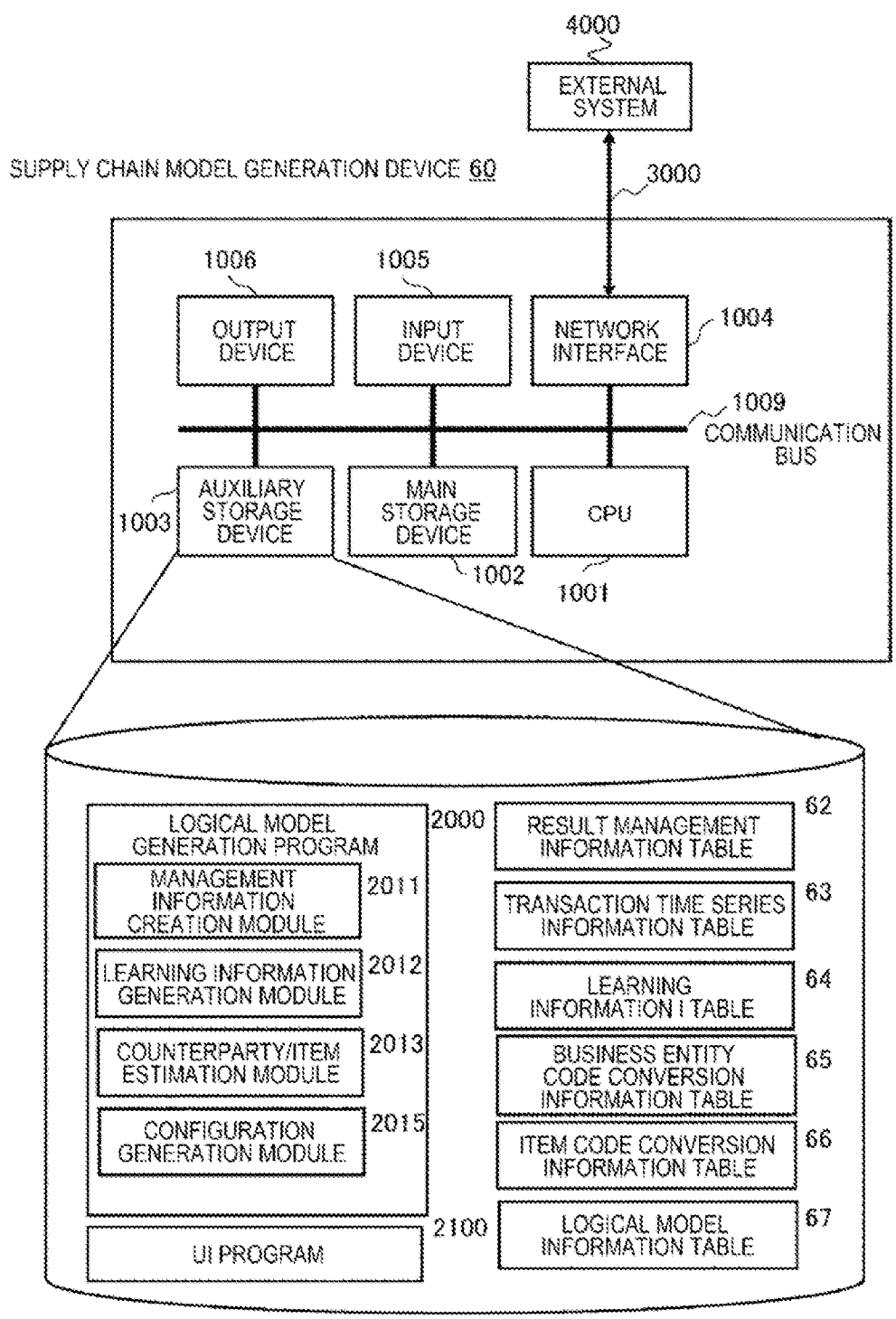
FIG. 2 is a hardware/software configuration diagram of a supply chain model generation device according to Embodiment 1.

The management information creation module 2011, the learning information generation module 2012, the counterparty/item estimation module 2013, and the configuration generation module 2015 are respectively programs for realizing the management information creation portion 611, the learning information generation portion 612, the counterparty/item estimation portion 613, and the configuration generation portion 615 illustrated in FIG. 1.

The result management information table 62, the transaction time series information table 63, the learning information I table 64, the business entity code conversion information table 65, the item code conversion information table 66, and the logical model information table 67 are stored in the auxiliary storage device 1003 and in response to necessity such as computational processing and the like are loaded to the main storage device 1002 and referred to by the CPU 1001.

Next, the data structure used in the supply chain model generation system of Embodiment 1 will be described with reference to FIGS. 3 to 8.

The result management information table 62 is a table assigning the information of each business entity 101A to the virtual business entity in order to use the result information 50A in the supply chain model generation system of the embodiment and is constituted of fields of a business entity ID 621, storage location information 622, business entity registration information 623, and a virtual business entity code I 624, as illustrated in FIG. 3.

In the business entity ID 621, ID information for uniquely identifying the business entity 101A is stored. In the storage location information 622, location information for accessing the result information 50A is stored and, for example, in the computer storing the result information 50 A the path of the file system is stored. The business entity registration information 623 is reference information registered by an operator of the supply chain model generation device 60 when the result information 50A is registered in the supply chain model generation device 60. It is mainly text type information in which the company name, the base name, and the like are expressed.

The virtual business entity code I 624 is code information uniquely assigned to each of the result information 50A by the management information creation portion 611. In this case, the virtual business entity is a virtual business entity mapped from an actual business entity in order for the supply chain model generation system of this embodiment to code and handle the actual business entity.

The transaction time series information table 63 is a table storing transaction information in the business entity and is constituted of fields of a virtual business entity code II 631, an actual counterparty code I 632, an actual item code I 633, transaction type 634, a date 635, interval days 636, and a quantity 637, as illustrated in FIG. 4.

In the virtual business entity code II 631, code information representing the virtual business entity allocated to the actual business entity is stored by the virtual business entity code I 624 of the result management information table 62 in FIG. 3. In the actual counterparty code I 632, the actual business entity code related to the transaction in the business is stored. The code of the item code actually used for the transactions of the business entity is stored in the actual item code I 633. In the transaction type 634, whether the form of the transaction is "Outbound" or "Inbound" is stored. "Outbound" is the type of transaction in which the business entity directly works toward the counterparty in relation to the transaction and "Inbound" is the type of transaction in which the business entity responds to a request or a work from a counterparty regarding the transaction.

In the present embodiment, when a business entity A and another business entity B deal transaction, if the transaction type of the transaction is recorded as "Outbound" in the result information of the business entity A, the transaction type of the transaction is recorded as "Inbound" in the result information of the other business entity B and vice versa.

In the date 635, the interval days 636, and the quantity 637, the date of the transaction, the number of day(s) between a transaction and a previous transaction related to the same item, and the quantity information of the transaction of the item are stored respectively.

The learning information I table 64 is a table storing the result of learning the distance of time series information of mutual transactions based on the transaction time series information table 63 in FIG. 4 and is constituted of fields of a supply-side virtual business entity code I 641, a supply-side actual counterparty code I 642, a supply-side actual item code I 643, a demand-side virtual business entity code I 644, a demand-side actual counterparty code I 645, a demand-side actual item code I 646, and a distance 647, as illustrated in FIG. 5.

In the supply-side virtual business entity code I 641, the supply-side actual counterparty code I 642, and the supply-side actual item code I 643, the virtual business entity code II 631, the actual counterparty code I 632, and the actual item code I 633 illustrated in FIG. 4 are respectively stored. Furthermore, in the demand-side virtual business entity code I 644, the demand-side actual counterparty code I 645, and the demand-side actual item code I 646, the virtual business entity code II 631, the actual counterparty code I 632, and the actual item code I 633 illustrated in FIG. 4 are respectively stored. Whether to enter the supply side or enter the demand side is determined depending on whether the transaction type information 634 is "Outbound" or "Inbound". That will be described in detail below.

The distance 647 stores a distance determined by a certain definition between pieces of the time series information of the transaction. The method of obtaining the distance between pieces of the time series information of the transaction will be described in detail below.

The business entity code conversion information table 65 is a table for virtualizing the business entity of the counterparty and allocating it to the code and is constituted of fields of an ID information 651, a virtual business entity code III 652, an actual counterparty code II 653, and virtual counterparty code 654, as illustrated in FIG. 6.

In the ID information 651, the identification information of this entry is stored. In the virtual business entity code III 652, a virtual business entity code in which the business entity is virtualized and coded is stored. The code in the business entity of the transaction is stored in the actual counterparty code II 653. In the virtual counterparty code 654, information in which the virtual counterparty virtualizing the actual counterparty is coded is stored in association with the virtual business entity code III 652 and the actual counterparty code II 653.

The item code conversion information table 66 is a table for virtualizing the item code in the transaction and allocating it to the code and is constituted of fields of an ID information 661, a virtual business entity code IV 662, an actual item code II 663, and a virtual item code I 664, as illustrated in FIG. 7.

In the ID information 661, identification information of this entry is stored. In the virtual business entity code IV 662, a virtual business entity code in which the business entity is virtualized and coded is stored. In the actual item code II 663, the actual item code in the transaction is stored. In the virtual item code I 664, a virtual item code obtained by virtualizing and coding the actual item code in association with the virtual business entity code IV 662 and the actual item code II 663 is stored.

The logical model information table 67 is the final product in the supply chain model generation system of the Embodiment and is a table for associating the virtual item code of the item related to the transaction, the virtual business entity code on the supply side, and the virtual business entity code on the demand side. The logical model information table 67 is constituted of fields of an ID information 671, a virtual item code II 672, a supply-side virtual business entity code II 673, and a demand-side virtual business entity code II 674, as illustrated in FIG. 8.

In the ID information 671, the identification information of this entry is stored. In the virtual item code II 672, the code of the virtual item code I 664 illustrated in FIG. 7 is stored. The supply-side virtual business entity code II 673 and the demand-side virtual business entity code II 674 respectively store the virtual business entity code of the business entity on the supply side and the virtual business entity code of the business entity on the demand side in one transaction. The supply side and the demand side are determined by the transaction type 634 of the transaction time series information table 63 illustrated in FIG. 4. This will be described in detail below.

Next, the processing of the supply chain model generation system of the Embodiment 1 will be described with reference to FIGS. 9 to 13.

First, the learning information generation processing performed by the learning information generation portion 612 will be described with reference to FIG. 9.

The processing from S102 to S104 is executed with the result information 50A stored in the data storage unit 40A as a target (S101 to S105).

First, transaction information is extracted from the result information 50A (S102).

From the extracted transaction information, transaction time series information is created for each group of the item and the counterparty (S103).

Then, the transaction time series information is stored in the transaction time series information table 63 for each business entity in terms of the group of the item and the counterparty (S104).

Next, for all entries in the transaction time series information table 63, the processing of S107 to S109 are repeatedly executed (S106 to S111).

First, time series information a of a virtual business entity A is taken (S106), and then transaction time series information b of a virtual business entity B is selected (S107, S110).

A distance of the time series information a and the time series information b is calculated (S108).

The index information and distance of the time series information a and the time series information b are stored in the learning information (S109).

This is repeated with all time series information a of the virtual business entity A and the transaction time series information b of the virtual business entity B.

Also, this is repeated for all virtual business entities A and virtual business entities B.

Here, the calculation of the distance of the time series information a and the time series information b will be described with reference to FIGS. 10A and 10B.

As described with reference to FIG. 4, the transaction time series information table 63 corresponds to one transaction made on one day when there is one entry. Therefore, the transaction where the virtual business entity code II 631, the actual counterparty code I 632, the actual item code I 633, the transaction type information 634 are matched is considered as the time series information of the transaction.

For example, the time series information a in FIG. 10A is constituted of a set of all entries in which the virtual business entity code II 631 is "VE1", the actual counterparty code I 632 is "F1", the actual item code I 633 is "G1", and the transaction type information 634 is "Outbound".

Further, it is assumed that the date information 635 of the first entry is "2017 Feb. 10" (year not shown in FIG. 10A), the interval days 636 is "0" (first transaction), and the quantity 637 is "20" and this is represented by a node $n_{a1}$ in FIG. 10A.

Similarly, it is assumed that the date information 635 of the second entry is "2017 Feb. 17", the interval days 636 is "7", and the quantity 637 is "60" and this is represented by a node $n_{a2}$ in FIG. 10A.

Similarly, it is assumed that the date information 635 of the second entry is "2017 Feb. 23", the interval days 636 is "6", and the quantity 637 is "30" and this is represented by a node $n_{a3}$ in FIG. 10A.

Furthermore, for example, the time series information b in FIG. 10A is constituted of a set of all entries in which the virtual business entity code II 631 is "VE2", the actual counterparty code I 632 is "F2", the actual item code I 633 is "G2", and the transaction type information 634 is "Inbound".

Further, it is assumed that the date information 635 of the first entry is "2017 Feb. 11 " (year not shown in FIG. 10A), the interval days 636 is "0" (first transaction), and the quantity 637 is "20" and this is represented by a node $n_{b1}$ in FIG. 10A.

Similarly, it is assumed that the date information 635 of the second entry is "2017 Feb. 18", the interval days 636 is "7", and the quantity 637 is "60" and this is represented by a node $n_{b2}$ in FIG. 10A.

Similarly, it is assumed that the date information 635 of the second entry is "2017 Feb. 27", the interval days 636 is "9", and the quantity 637 is "30" and this is represented by a node $n_{b3}$ in FIG. 10A.

Here, the interval days of the node $n_{a1}$ and the node $n_{a2}$ of the time series information a is considered as the distance between the node $n_{a1}$ and the node $n_{a2}$ and $d_{a1}=7$.

Similarly, the interval days of the node $n_{a2}$ and the node $n_{a3}$ of the time series information a is considered as the distance between the node $n_{a2}$ and the node $n_{a3}$ and $d_{a2}=6$.

Next, the interval days of the node $n_{b1}$ and the node $n_{b2}$ of the time series information b is considered as the distance of the node $n_{b1}$ and the node $n_{b2}$ and $d_{b1}=7$.

Similarly, the interval days of the node $n_{b2}$ and the node $n_{b3}$ of the time series information b is considered as the distance of the node $n_{b2}$ and the node $n_{b3}$ and $d_{b2}=9$.

In this case, a distance $D_{ab}$ of the time series information a and the time series information b is defined by the following Expression (1) by corresponding the node $n_{a1}$, the node $n_{a2}$, and the node $n_{a3}$ to the node $n_{b1}$, the node $n_{b2}$, and the node $n_{b3}$.

$$D_{ab}=|d_{a1}-d_{b1}|+|d_{a2}-d_{b2}| \qquad (1)$$

Therefore, the distance $D_{ab}$ of the time series information a and the time series information b in this case is 3.

That is, the closer the number of days of the transactions of the time series information a and the time series information b is, the shorter the distance is defined.

In addition, when the corresponding node cannot be obtained as illustrated in FIG. 10B (when the time series information b is constituted of only of the node $n_{b1}$ and the node $n_{b2}$), the interval days of one transaction is used as the distance.

That is, in this case, the distance $D_{ab}$ of the time series information a and the time series information b is defined by the following Expression (2).

$$D_{ab}=|d_{a1}-d_{b1}|+|d_{b2}| \qquad (2)$$

Here, when the business entity A and the business entity B performed the same transaction, the transaction dates are the same, so that the distance of respective pieces of the time series information will be 0.

Next, the counterparty/item estimation processing performed by the counterparty/item estimation portion 613 will be described with reference to FIG. 11.

The counterparty/item estimation processing is constituted of counterparty estimation processing and item estimation processing. The counterparty estimation processing is processing of associating the virtual business entity code with the actual counterparty code and generating the code of the virtual counterparty and the item estimation processing is processing of associating the virtual business entity code with the actual item code and generating the virtual item code.

First, the counterparty/item estimation processing executes the following for the group of the supply-side virtual business entity code I 641 and the supply-side actual counterparty code I 642 in the learning information I table 64 (S201 to S209).

Next, the following is executed for the group of the demand-side virtual business entity code I 644 and the demand-side actual counterparty code I 645 in the learning information I table (S202 to S205).

In relation to the supply-side actual item code I 643 of that entry of the supply-side virtual business entity code I 641, the demand-side actual item code I 646 in the entry in which the distance 647 is the smallest is selected (S203).

All the entries having the selected demand-side actual item code I 646 are selected and the distance 647 in the entry is extracted, and further the sum of the distances is calculated, and then the sum is used as the similarity degree of the demand-side actual counterparty code I 645 of the group of the supply-side virtual business entity code I 641 and the supply-side actual counterparty code I 642 and the group of the demand-side virtual business entity code I 644 and the demand-side actual counterparty code I 645 (S204). Here, it is noted that the smaller the similarity degree is, the more significant the two have similarities.

Then, a combination of the demand-side actual counterparty code I 645 with the supply-side actual counterparty code I 642 where the similarity degree is the smallest is selected (S206).

A new unique virtual counterparty code is generated and stored in the virtual counterparty code 654 of a business entity code I conversion information table in association with the demand-side actual counterparty code I 645 with the supply-side virtual business entity code I 641 (S207).

Also, the generated virtual counterparty code is stored in the virtual counterparty code 654 of the business entity code I conversion information table in association with the demand-side virtual business entity code I 644 and the supply-side actual counterparty code I 642 (S208).

Then, the item estimation processing illustrated in FIG. 12 is executed (S300).

Next, details of the item estimation processing illustrated in FIG. 12 will be described.

In the entry of the combination of the selected supply-side actual counterparty code I 642 and the demand-side actual counterparty code I 645, the demand-side actual item code I 646 of which the distance 647 is the smallest with respect to the supply-side actual item code I 643 in the entry is selected (S301).

Then, a new unique virtual item code is generated and stored in the virtual item code I 664 of the item code conversion information table 66 in association with the supply-side virtual business entity code I 641 and the supply-side actual item code I 643 (S302).

Next, the generated virtual item code is stored in the virtual item code I 664 of the item code conversion information table 66 in association with the demand-side virtual business entity code I 644 and the demand-side actual item code I 646 (S303).

Figure 13:
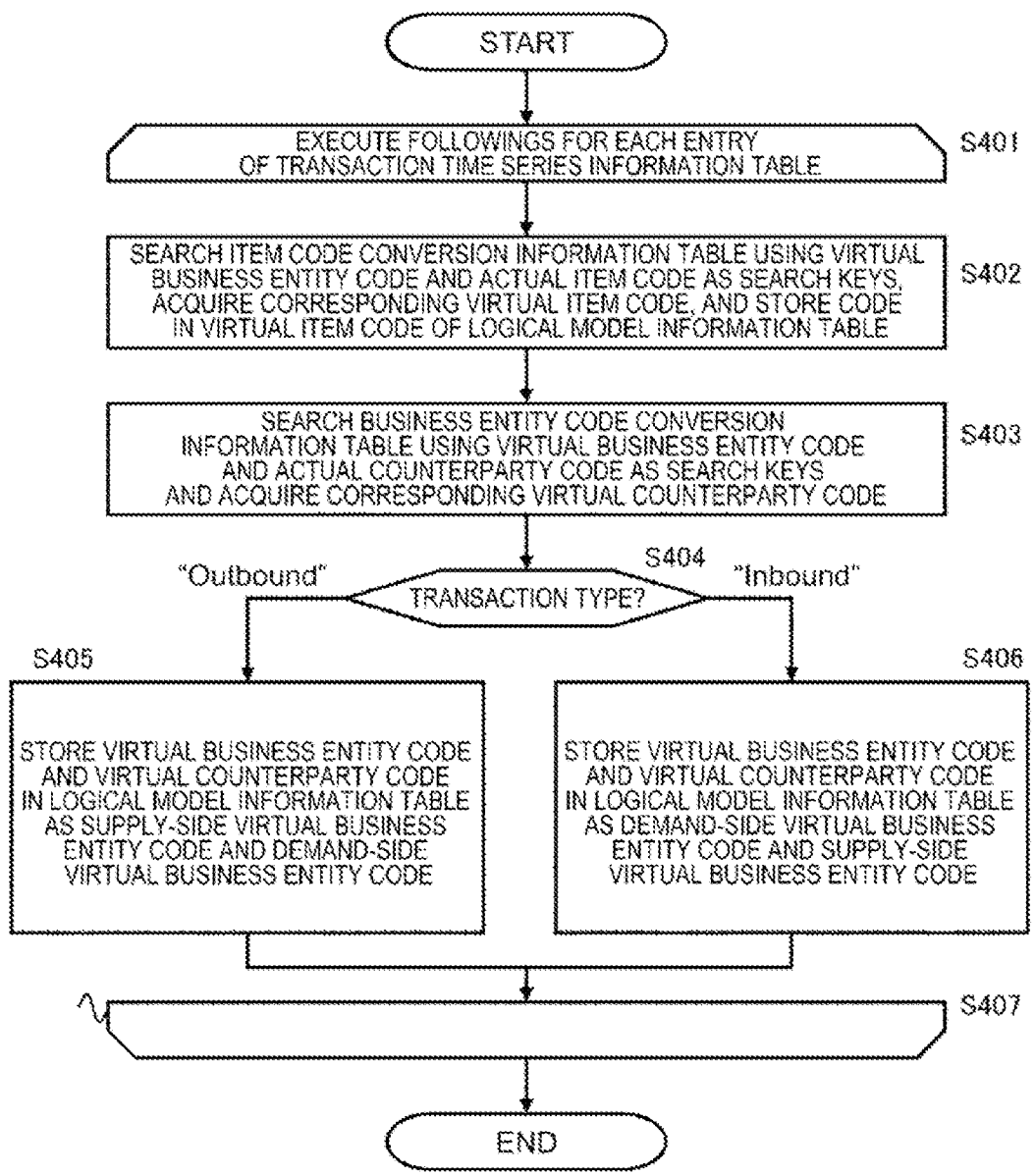
FIG. 13 is a flowchart illustrating a configuration generation processing.

Next, the configuration generation processing performed by the configuration generation portion 615 will be described with reference to FIG. 13.

The configuration generation processing is processing of generating the logical model information table 67 in which the virtual item codes are associated with the virtual business entity code on the supply side and the virtual business entity code on the demand side.

In the configuration generation processing, the following is executed for each entry of the transaction time series information table 63 (S401 to S407).

First, an entry of the item code conversion information table 66 is searched using the virtual business entity code II 631 and the actual item code I 633 as search keys and the corresponding virtual item code I 664 is acquired, and then it is stored in the virtual item code II 672 of the logical model information table 67 (S402).

Next, an entry of the business entity code conversion information table 65 is searched using the virtual business entity code II 631 and the actual counterparty code I 632 as search keys and the corresponding virtual counterparty code 654 is acquired (S403).

Then, the transaction type 634 of the entry is determined (S404).

When the transaction type 634 is "Outbound", the virtual business entity code II 631 is set as the supply-side virtual business entity code and the virtual counterparty code is set as the demand-side virtual business entity code, and then the codes are stored in the supply-side virtual business entity code II 673 and the demand-side virtual business entity code II 674 of the logical model information table 67, respectively (S405).

On the contrary, when the transaction type 634 is "Inbound", the virtual business entity code II 631 is set as the demand-side virtual business entity code and the virtual counterparty code is set as the supply-side virtual business entity code, and then the codes are stored in the demand-side virtual business entity code II 674 and the supply-side virtual business entity code II 673 of the logical model information table 67, respectively (S406).

In the embodiment, by subtracting the result management information table 62 and the item code conversion information table 66 from the logical model information table 67, it is possible to reverse the actual item code in the actual business entity.

As described above, in the embodiment, from the viewpoint of a distance of the time series transaction information, each business entity and item code can be completely virtualized via the concept of a virtual counterparty and simulation can be performed with reference to the logical model information table 67, and further it is possible to absorb differences in the code description in each actual business entity.

Embodiment 2

Hereinafter, Embodiment 2 will be described with reference to FIGS. 14 to 17.

In Embodiment 1, the counterparty/item estimation portion 613 generates the business entity code conversion information table 65 and the item code conversion information table 66 and the logical model information table 67 which associates the virtual item code with the virtual business entity code is generated through the concept of the virtual counterparty code.

In the embodiment, when the business entity code conversion information table 65 and the item code conversion information table 66 are generated, new learning information which associates the virtual business entity code on the supply side and the actual counterparty code with the virtual business entity code on the demand side and the actual counterparty code is created and the business entity code conversion information table 65 and the item code conversion information table 66 are generated by causing a user to select the new learning information, and then the association of the actual counterparty code with the virtual counterparty code and the association of the actual item code with the virtual item code are performed.

In the embodiment, description will be made centering on points different from Embodiment 1.

First, the configuration of a supply chain model generation system of Embodiment 2 will be described with reference to FIGS. 14 and 15.

Figure 14:
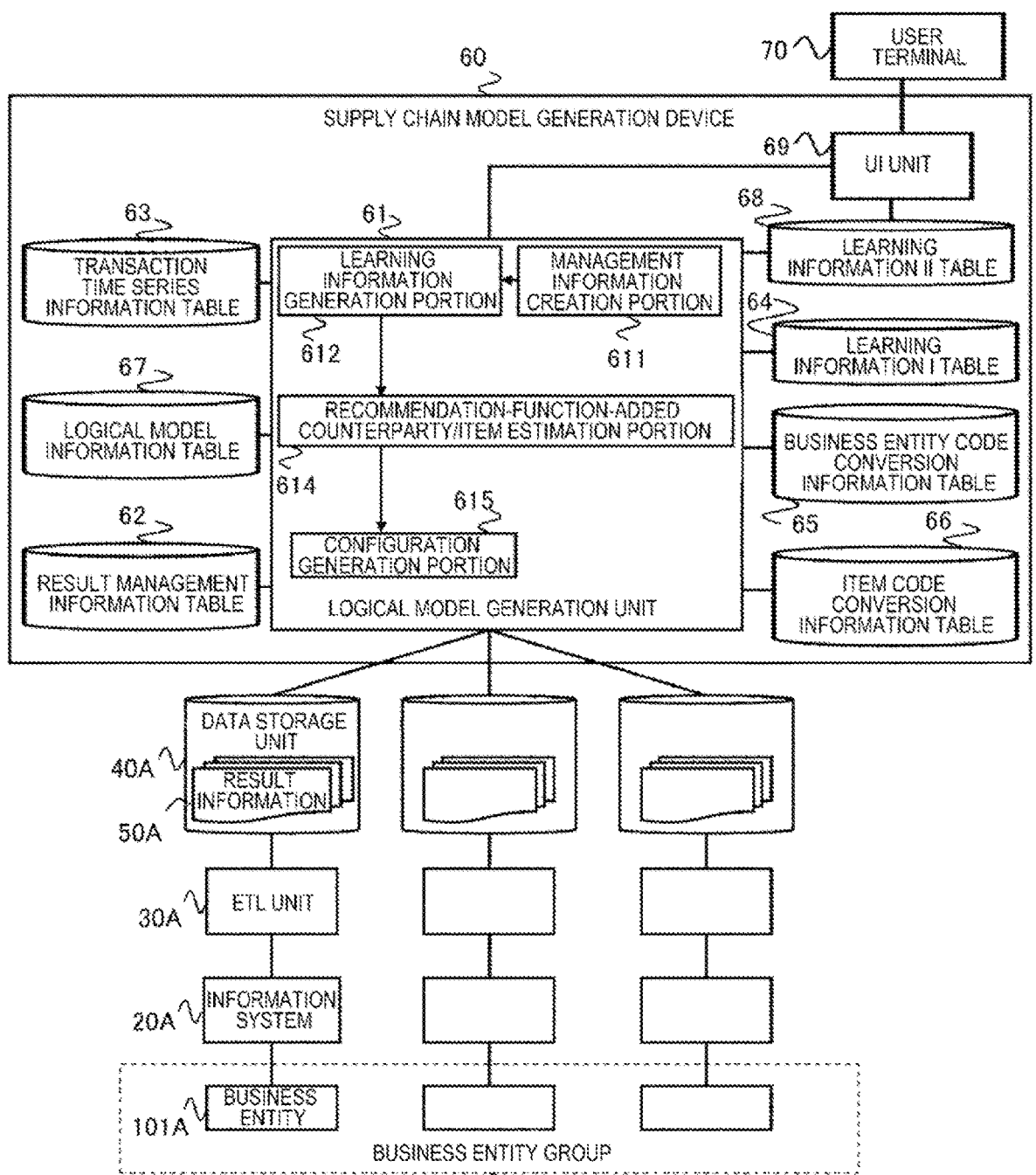
FIG. 14 is a block diagram illustrating a configuration of a supply chain model generation system according to Embodiment 2.
Figure 15:
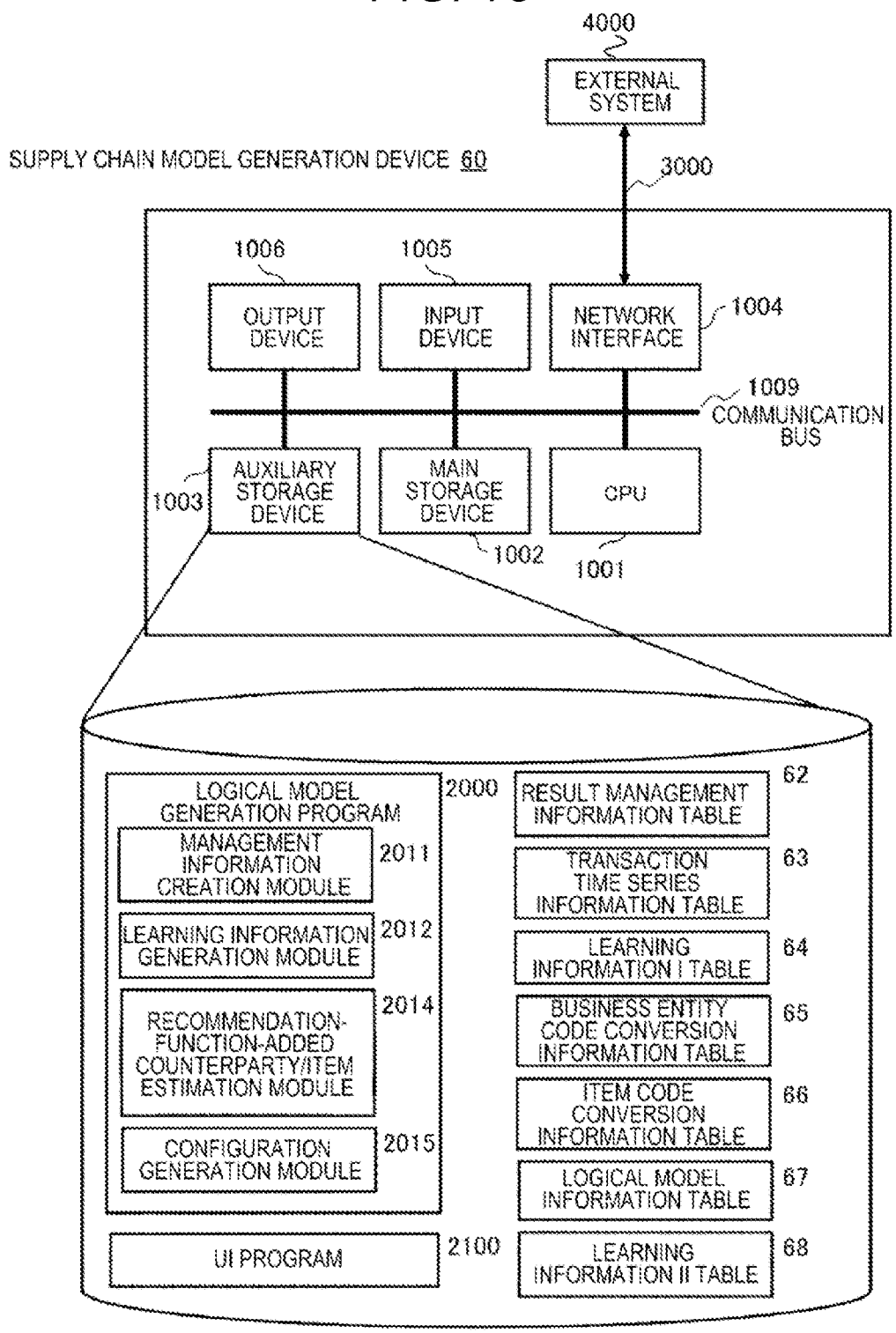
FIG. 15 is a hardware/software configuration diagram of a supply chain model generation device according to Embodiment 2.

Compared to the configuration of Embodiment 1, the configuration of the supply chain model generation device 60 of the embodiment has a recommendation-function-added counterparty/item estimation portion 614 instead of the counterparty/item estimation portion 613, as illustrated in FIG. 14.

Further, in addition to the learning information I table 64, a learning information II table 68 is held.

The hardware configuration of the supply chain model generation device according to the embodiment is similar to the hardware configuration of Embodiment 1.

The supply chain model generation device of the embodiment is different from the software configuration diagram of the Embodiment 1 in that a recommendation-function-added counterparty/item estimation module 2014 is installed in the auxiliary storage device 1003 instead of the counterparty/item estimation module 2013.

Further, in addition to the learning information I table 64, a learning information II table 68 is stored in the auxiliary storage device 1003.

Next, with reference to FIG. 16, the data structure of the supply chain model generation system of Embodiment 2 which is different from Embodiment 1 will be described.

FIG. 16 is a diagram for explaining an example of the learning information II table.

The learning information II table 68 is a table holding learning information constituted of the association of the virtual business entity code on the supply side and the actual counterparty code with the virtual business entity code on the demand side and actual counterparty code and their similarity degree and has respective fields of an ID 681, a supply-side virtual business entity code III 682, the supply-side actual counterparty code II 683, a supply-side business entity registration information 684, a demand-side virtual business entity code III 685, the demand-side actual counterparty code II 686, a demand-side business entity registration information 687, and a similarity degree 688, as illustrated in FIG. 16.

In the ID 681, the identification information of the entry of the learning information II table is stored. In the supply-side virtual business entity code 682 and the supply-side actual counterparty code II 683, the supply-side virtual business entity code I 641 and the supply-side actual counterparty code I 642 of the learning information I table are respectively stored. In the demand-side virtual business entity code III 685 and the demand-side actual counterparty code II 686, the demand-side virtual business entity code I 644 and the demand-side actual counterparty code I 645 of the learning information I table are respectively stored. In the supply-side business entity registration information 684, the business entity registration information 623 of the result management information table 62 corresponding to the supply-side actual counterparty code II 683 is stored and, in the demand-side business entity registration information 687, the business entity registration information 623 of the result management information table 62 corresponding to the demand-side actual counterparty code II 686 is stored. Those fields display the business entity registration information as information which is easy to understand for a user and are used as an aid in determination for selection.

In the similarity degree 688, the similarity degree of the group of the supply-side virtual business entity code III 682 and the supply-side actual counterparty code II 683 and the group of the demand-side virtual business entity code III 685 and the demand-side actual counterparty code II 686 of recommendation-function-added counterparty/item estimation processing to be described later is stored.

Figure 17:
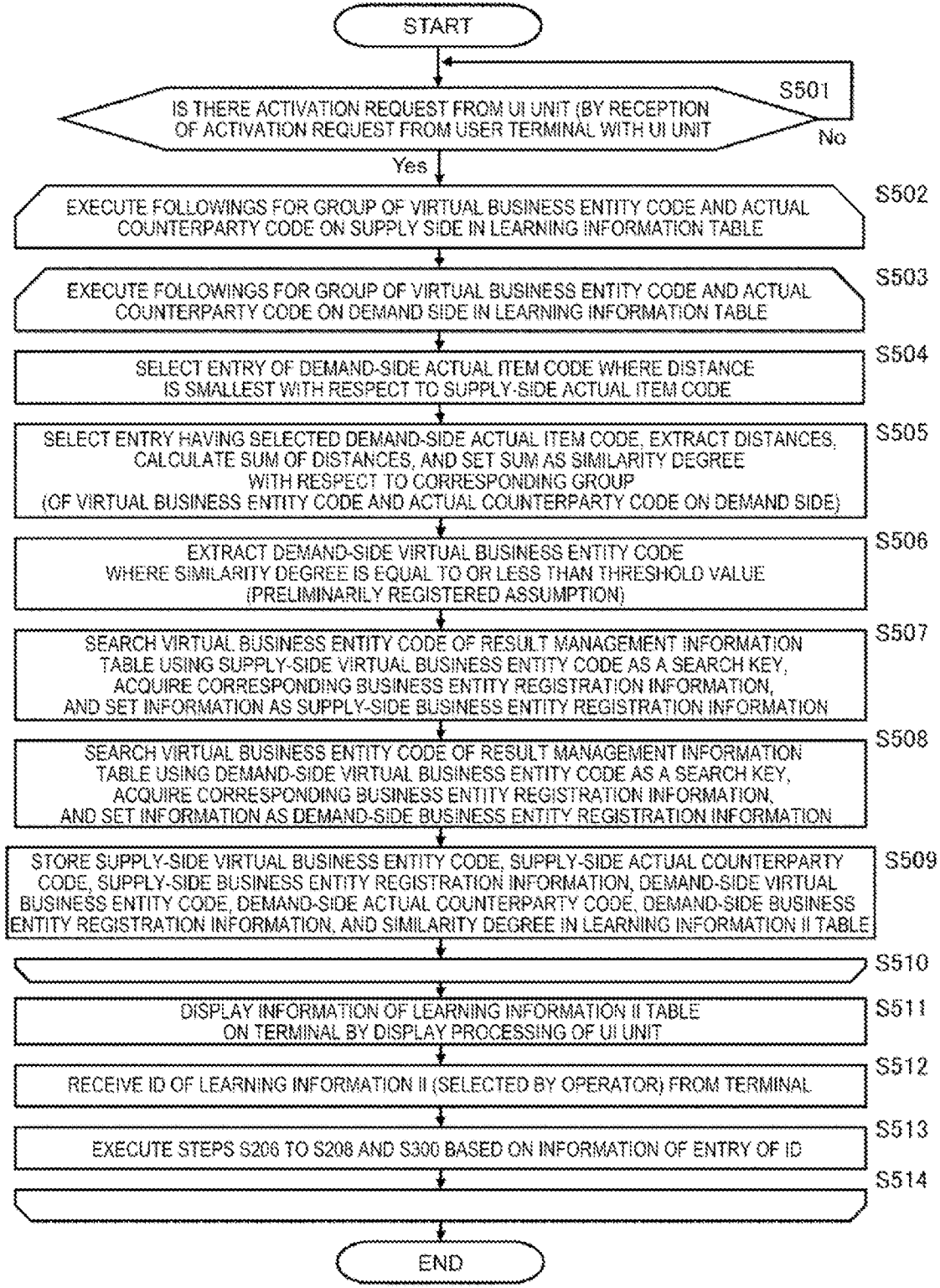
FIG. 17 is a flowchart illustrating counterparty/item estimation processing with a recommendation function.

Next, with reference to FIG. 17, the recommendation-function-added counterparty/item estimation processing will be described.

First, it is determined whether or not there is an activation request from the UI unit 69 (by the UI 69 receiving the activation request from the terminal) (S501). When there is no activation request (S501: No), the process waits until there is an activation request from the UI unit 69.

When there is an activation request (S501: Yes), the following is executed for the group of the supply-side virtual business entity code I 641 and the supply-side actual counterparty code I 642 in the learning information I table 64 (S502 to S514).

Next, the following is executed for the group of the demand-side virtual business entity code I 644 and the demand-side actual counterparty code I 645 in the learning information I table (S503 to S510).

For the supply-side actual item code I 643 in that entry, the entry of the demand-side actual item code I 646 where the distance is the smallest is selected (S504).

An entry having the selected demand-side actual item code is selected and the distance 647 in the entry is extracted, and then the sum of the distances is calculated and the sum is used as the similarity degree of the supply-side virtual business entity code I641 and the supply-side actual counterparty code I 642, and the demand-side virtual business entity code I 644 and the demand-side actual counterparty code I 645 (S505).

Then, the demand-side virtual business entity code I 644 where the similarity degree is equal to or less than a threshold value (preliminarily registered assumption) is extracted (S506). Here, the fact that the similarity degree is small means that the distance is close and that the two are similar.

Next, the virtual business entity code I 624 of the result management information table 62 is searched using the supply-side virtual business entity code I 641 as a search key and the corresponding business entity registration information 623 is acquired, and further, the acquired information is set as the supply-side business entity registration information (S507).

Further, the virtual business entity code I 624 of the result management information table 62 is searched using the demand-side virtual business entity code I 644 as a search key and the corresponding business entity registration information 623 is acquired, and further, the acquired information is set as the demand-side business entity registration information (S508).

Then, the supply-side virtual business entity code I 641, the supply-side actual counterparty code I 642, the supply-side business entity registration information, the demand-side virtual business entity code I 644, the demand-side actual counterparty code I 645, the demand-side business entity registration information, and the similarity degree are respectively stored in the fields of the supply-side virtual business entity code III 682, the supply-side actual counterparty code II 683, the supply-side business entity registration information 684, the demand-side virtual business entity code III 685, the demand-side actual counterparty code II 686, the demand-side business entity registration information 687, and the similarity degree 688 of the learning information II table (S509).

Next, the information of the learning information II table 68 is displayed on the user terminal 70 by display processing of the UI unit 69 (S511) and the entries (that is, the combination of the virtual business entity code on the supply side and the actual counterparty code and the virtual business entity code on the demand side and the actual counterparty code) approved by a user are selected.

Next, the recommendation-function-added counterparty/item estimation portion 614 receives the ID 681 of the learning information II table 68 (selected by an operator) from the user terminal 70 (S512).

Figure 9:
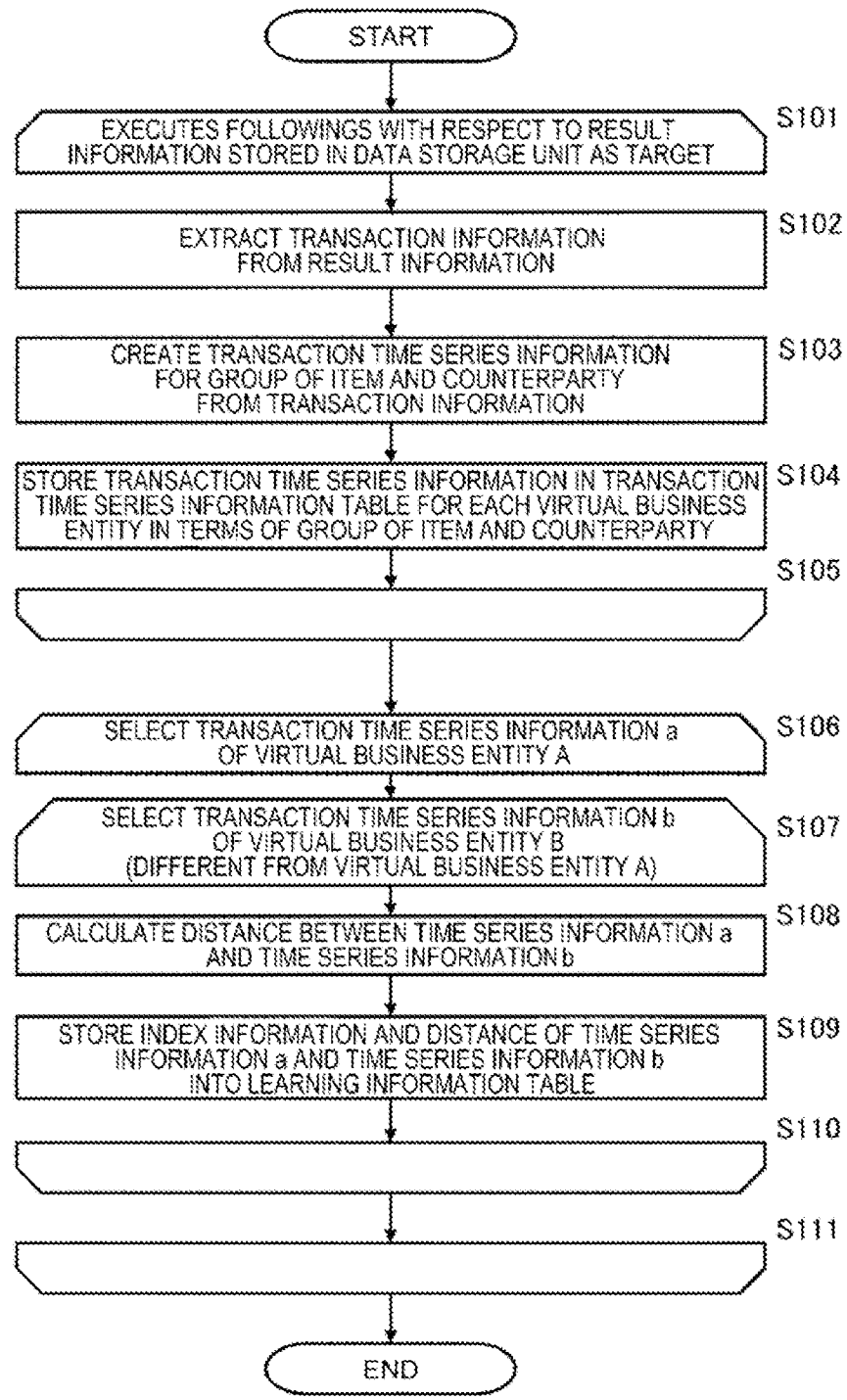
FIG. 9 is a flowchart illustrating learning information generation processing.

Then, based on the information of the entry of the ID 681, S206 to S208 of FIG. 11 and S300 of FIG. 9 are executed (S513).

However, in processing of S513, the supply-side virtual business entity code I 641, the supply-side actual counterparty code I 642, the demand-side virtual business entity code I 644, and the demand-side actual counterparty code I 645 of the learning information I table 64 described in Embodiment 1 are respectively replaced by the supply-side virtual business entity code III 682, the supply-side actual counterparty code II 683, the demand-side virtual business entity code III 685, and the demand-side actual counterparty code II 686 of the learning information II table.

In the embodiment, the similarity degree of the virtual business entity code on the supply side, the actual counterparty code, and the virtual business entity code on the demand side, the actual counterparty code, which is calculated by the distance of the supply-side actual item code and the demand-side actual item code is calculated, and then non-similar ones are cut out and a user selects the combination from the candidates, and thus it is possible to achieve more accurate association.

Although the present disclosure has been described with reference to example embodiments, those skilled in the art will recognize that various changes and modifications may be made in form and detail without departing from the spirit and scope of the claimed subject matter.

What is claimed is:

1. A supply chain model generation system, for improving discrepancies among a plurality of business entities, which generates a logical model related to a transaction of a supply chain constituted of the plurality of business entities, comprising:
a memory,
an auxiliary storage device:
an input/output device:
a network interface; and a processor, the processor communicatively coupled to the memory, the auxiliary storage device, the input/output device and the network interface, the processor configured to:

receive, from the memory, a business entity code representing each business entity and an item code representing an item related to the transaction that are independently used in result information on a supply chain operation of the plurality of business entities, extract transaction information from the result information and create a transaction time series information table, assign, for each business entity of the plurality of business entities, a relationship in the transaction time series information table in each business entity that is analyzed and a virtual business entity code on a supply-side and a virtual business entity code on a demand-side, wherein at least two of the plurality of business entities have the virtual business entity code on the supply-side that are identical and at least two of the plurality of business entities have the virtual business entity code on the demand-side that are identical, select, from the plurality of business entities, two business entities and corresponding time series data, calculate a distance between the time series data of the selected two business entities, store the calculated distance, and repeat the calculation for each of the plurality of business entities, wherein the distance between the time series data is determined by calculating a number of days between each node for each business entity, performing subtraction of a first node for one business entity from a first node of another business entity to obtain a first value, obtaining an absolute value of the first value, performing the subtraction for each node pair in each business entity to obtain other values, obtaining an absolute value of the other values and adding together the absolute value of the first value and the absolute value of the other values, select a smallest calculated distance of the virtual business entity code on the demand-side and a corresponding demand-side actual item code, and select a smallest calculated distance of the virtual business entity code on the supply-side and a corresponding supply-side actual item code, select all entries having the corresponding demand-side actual item code and select all entries having the corresponding supply-side actual item code, calculate a similarity degree of a demand-side actual counterparty code using the corresponding demand-side actual item code for each entry and calculate a similarity degree of a supply-side actual counterparty code using the corresponding supply-side actual item code for each entry, determine, for each entry, if a distance between entries is close by determining if the similarity degree is equal to or less than a predetermined threshold, and if the similarity degree is equal to or less than a predetermined threshold extract the demand-side virtual business entity code for that entry, acquire, using the extracted demand-side virtual business entity code, business entity information, display to a user the business entity information, receive an input from the user selecting at least one of the entries, select, based on the user selection, a combination of one of the demand-side actual counterparty codes and one of the supply-side actual counterparty codes that have the smallest similarity degree, and generate a unique virtual counterparty code, select the demand-side actual item code with the smallest calculated distance with respect to the supply-side actual item code in entry of the selected combination of the one of the demand-side actual counterparty code and the one of the supply-side actual counterparty codes, generate a new unique virtual item code, and store in a logical model information table where a virtual item code is assigned with respect to an item code related to the transaction of a business entity of the virtual business entity code on the supply side and a business entity of the virtual business entity code on the demand side, display the logical model information table via the input/output device, and generate a supply chain model for a simulation using the new unique virtual item code and the unique virtual counterparty code.

2. The supply chain model generation system according to claim 1, wherein the virtual business entity code assigned to each one of the plurality of business entities, an actual counterparty code of a counterparty in a transaction, an actual item code of an item in a transaction, and a date related to a transaction are associated for each business entity in the transaction time series information table, a mutual distance of entries in the transaction time series information table is obtained based on the date related to the transaction, a virtual business entity code, an actual counterparty code, and an actual item code related to one side of a transaction are respectively set as a supply-side virtual business entity code, a supply-side actual counterparty code, and a supply-side actual item code and a virtual business entity code, an actual counterparty code, and an actual item code related to a partner side of the transaction are respectively set as a demand-side virtual business entity code, a demand-side actual counterparty code, and a demand-side actual item code, to be associated as one transaction time series information, and the mutual distance of the transaction time series information is held in a first learning information table.

3. The supply chain model generation system according to claim 2, wherein a supply-side virtual business entity code and a supply-side actual counterparty code in the first learning information table are selected as a group, a demand-side virtual business entity code and a demand-side actual counterparty code of the first learning information table are selected as a group for the group of a selected supply-side virtual business entity code and a selected supply-side actual counterparty code, the demand-side actual item code having the smallest distance to the supply-side actual item code corresponding to the entries of the demand-side virtual business entity code and the demand-side actual counterparty code of the first learning information table is selected, entries having the selected demand-side actual item code are selected and distances in the entries are extracted, and further a sum of the distances of the selected demand-side actual item code is calculated, and then the sum is set as a similarity degree of a group of the supply-side virtual business entity code and the supply-side actual counterparty code and a group of the demand-side virtual business entity code and the demand-side actual counterparty code, the combination of the demand-side actual counterparty code with the supply-side actual counterparty code where the similarity degree is the smallest is selected, the new unique virtual counterparty code is generated and the virtual counterparty code is stored in a business entity code conversion information table in association with the supply-side virtual business entity code and the demand-side actual counterparty code, and the virtual counterparty code is stored in the business entity code conversion information table in association with the demand-side virtual business entity code and the supply-side actual counterparty code.

4. The supply chain model generation system according to claim 3, wherein the demand-side actual item code of which a distance to the supply-side actual item code is the smallest is selected in the entry of a combination of the supply-side actual counterparty code and the demand-side actual counterparty code in the first learning information table, the new unique virtual item code is generated and stored in an item code conversion information table in association with the supply-side virtual business entity code and the supply-side actual item code, and the virtual item code is stored in the item code conversion information table in association with the demand-side virtual business entity code and the demand-side actual item code.

5. The supply chain model generation system according to claim 4, wherein the transaction time series information table further has a field of a transaction type, for each entry of the transaction time series information table, the item code conversion information table is searched using the virtual business entity code and the actual item code as search keys and a corresponding virtual item code is acquired, and is stored in a virtual item code of the logical model information table, a business entity code conversion information table is searched using the virtual business entity code and the actual counterparty code as search keys and a corresponding virtual counterparty code is acquired, if the transaction type of the entry in the transaction time series information table is determined to be "Outbound", the virtual business entity code in the entry and the virtual counterparty code in the entry are stored in the logical model information table as the supply-side virtual business entity code and the demand-side virtual business entity code, and if the transaction type of the entry in the transaction time series information table is determined to be "Inbound", the virtual business entity code in the entry and the virtual counterparty code in the entry are stored in the logical model information table as the demand-side virtual business entity code and the supply-side virtual business entity code.

6. The supply chain model generation system according to claim 2, wherein the supply-side virtual business entity code and the supply-side actual counterparty code in the first learning information table are selected as a group, a demand-side virtual business entity code and a demand-side actual counterparty code of the first learning information table are selected as a group for the group of a selected supply-side virtual business entity code and a selected supply-side actual counterparty code, a demand-side actual item code having the smallest distance to a supply-side actual item code corresponding to entries of the demand-side virtual business entity code and the demand-side actual counterparty code of the first learning information table is selected, entries having the selected demand-side actual item code are selected and distances in the entries are extracted, and further a sum of the distances of the selected demand-side actual item code is calculated, and then the sum is set as a similarity degree of the group of the supply-side virtual business entity code and the supply-side actual counterparty code and the group of the demand-side virtual business entity code and the demand-side actual counterparty code, the group of the supply-side virtual business entity code and the supply-side actual counterparty code and the group of the demand-side virtual business entity code and the demand-side actual counterparty code of which the similarity degree is equal to or less than a predetermined threshold value are stored in a second learning information table in a state of being associated with the similarity degree, the second learning information table is displayed on a terminal and selection of the entry from a user is input, and the logical model information table is generated based on information of the selected entry of the second learning information table.

* * * * *